United States Patent [19]
Davies et al.

[11] 3,777,260
[45] Dec. 4, 1973

[54] GRID FOR MAKING ELECTRICAL CONTACT

[75] Inventors: Phillip J. Davies, La Grangeville; Angelo S. Gasparri, Poughkeepsie; Daniel J. McAtee, Rhinebeck, all of N.Y.

[73] Assignee: International Business Machines Corporation, Armonk, N.Y.

[22] Filed: Dec. 14, 1972

[21] Appl. No.: 315,264

[52] U.S. Cl. .............. 324/64, 324/72.5, 324/158 P
[51] Int. Cl. ............................................ G01r 27/14
[58] Field of Search .................. 324/64, 62, 158 P, 324/158 T, 72.5, 149; 339/108 TP

[56] References Cited
UNITED STATES PATENTS

| | | | |
|---|---|---|---|
| 3,308,378 | 3/1967 | Murray | 324/158 T |
| 3,453,545 | 7/1969 | Oates | 324/72.5 X |
| 3,493,858 | 2/1970 | Baron et al. | 324/72.5 |

*Primary Examiner*—Stanley T. Krawczewicz
*Attorney*—James E. Murray et al.

[57] ABSTRACT

This specification discloses a checker for checking electrical continuity. The checker uses a grid of lines as a probe to make electrical contact to points on the circuit being checked. This probe relies on the close spacing between the lines of the grid to make the connection to the points as opposed to the accurate registration between the position of the lines of the grid with the position of the points to be contacted.

6 Claims, 4 Drawing Figures

PATENTED DEC 4 1973 3,777,260

GRID FOR MAKING ELECTRICAL CONTACT

BACKGROUND OF THE INVENTION

The present invention relates to the testing for continuity where it is difficult to obtain registration between the probes of the testing equipment and the points to be contacted on the circuit being checked.

A commonly used method of making continuity or impedance checks between two points is called the Kelvin measurement technique. This involves contacting the two points with two sets of probes. One set of probes is used to pass electrical current between the two points and the other set of probes is used to measure the voltage across the two points. The use of this multi-probe technique to measure the impedance between two points minimizes the effect that the contact resistance between the probes and the points has on the accuracy of the measurements. This is because the measurement path is separated from the current supplying path allowing the measurement meter to be placed in series with an impedance which is large relative to the contact imepdances.

As circuits have been reduced in size and made more complex it has become more difficult to automatically perform the described test because of the reduction in the size of the points that must be contacted by the probes. In ceramic circuit modules substrates of the type containing a number of chip sites for mounting semiconductor circuit chips the problem is further aggrevated by the curing process for the ceramic. As the green substrate cures, the points to which electrical contact is to be made move so that their position will vary from substrate to substrate. For instance, a point to be contacted may be 4 mils in diameter and may vary as much as 2 or 3 mils in position from one chip site to another as a result of the curing process. Therefore, a fixed probe that is accurately aligned to contact the point on one chip site would miss the point altogether on another chip site. This makes it extremely difficult to test chip sites automatically with fixed probes because thousands of connections must be made simultaneously.

THE INVENTION

In accordance with the present invention the problem of registration between probes and the points to be contacted is eliminated by the use of a grid of probes mounted on a flexible support. The grid comprises a series of interlaced lines with lines for the two connections to be made to the points positioned one along side of the other in a repeating pattern on centers that are similar than the radius of the point to be contacted. The grid is then made to overlie the points to be contacted so that it is impossible for each of the points not to be contacted by two lines.

Therefore, it is an object of the present invention to provide a new electrical contact.

Another object of the present invention is to provide electrical contact for making Kelvin measurements to points that are difficult to probe with fixed position probes.

These and other objects, features and advantages of the invention will be apparent from the following more particular description of the preferred embodiments of the invention as illustrated in the drawings, of which:

DESCRIPTION OF THE DRAWINGS

Referring now to FIG. 1, a chip site pattern for a ceramic module substrate includes a plurality of relatively large rectangular pads 10 around a large number of small circular contacts 12. Pads 10 are connected to the circular contacts 12 by plated-through via holes and printed circuit lines such as line 14 on the opposite surface of the chip. All these connections must be checked for continuity in the manufacture of the module. The continuity check is usually performed by making Kelvin measurements. To make a Kelvin measurement in every path, such as path 14, between a pad 10 and circuit contact 12 it is necessary to contact each pad 10 and each circular contact 12 with the two probes. In the past fixed position probes would be used to contact both the pads 10 and points 12 to make the connection. However, with the advent of the small circuits and the use of ceramics the points 12 have been more difficult to contact because of reduction in size and variations in their position from one chip to another.

FIG. 2 illustrates how a single connection is tested in accordance with the present invention to overcome this problem. The connection between pad 10 and point 12 is through the printed circuit line 14 and plated-through vias 16 and 18. Electrical connections to the pad 10 are made by two flexible beam probes 22 and 20 which bend under contact pressure. Electrical connections to the point 12 are made through a conductive grid mounted on a flexible support. The grid contains one set of fingers 24 interlaced with another set of fingers 26. The center to center spacing of the fingers is smaller than the radius of the point 12 to be contacted so that when the matrix probe overlies the area containing the point 12 to be contacted it is impossible for the point not to be touched by one finger 24' from the first set and another finger 26' from the second set.

Figure 1:
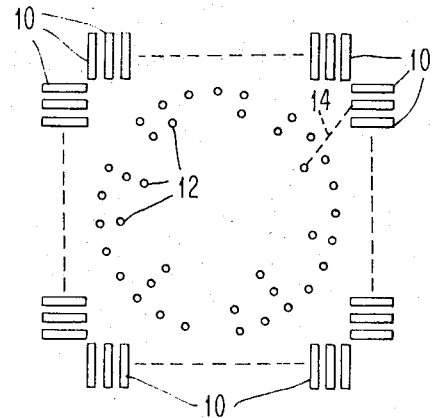
FIG. 1 is a plan view of a single chip site on a ceramic wafer.
Figure 2:
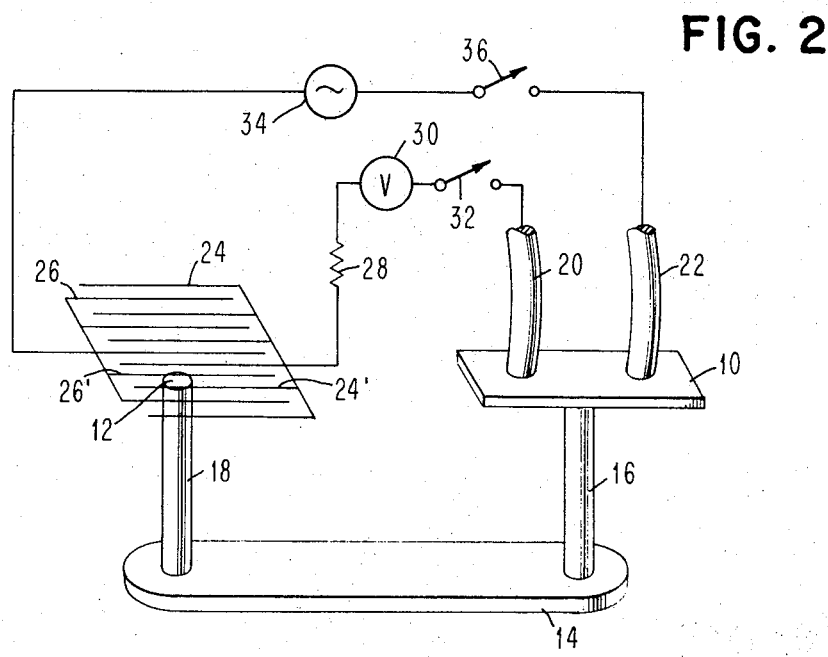
FIG. 2 is a perspective view showing how electrical connections are made for testing continuity between two points of the chip site shown in FIG. 1.

The first set of fingers 24 is electrically connected to the bendable beam contact 20 through a resistor 28, volt meter 30 and switch 32 while the second set of fingers 26 is connected to bendable beam contact 22 through current source 34 and switch 36. Now, when the switch 36 is closed current from source 34 flows in one circuit through via 16, interconnection 14 and via 18 between pad 10 and terminal 12 to establish a voltage drop between pad 10 and terminal 12. This voltage drop is measured by volt meter 30 when switch 32 is closed since the volt meter is then connected between the pad 10 and terminal 12. Resistor 28 is connected in series with the volt meter so that the contact resistance between pad 10 and probe 12 and between finger 24' and terminal 12 does not effect the measurements. This resistance 28 is very large in relation to the contact resistances so variation in contact resistance from one measurement site to another will be only a small percentage of the voltage drop across the terminals of the meter. Therefore, the contact resistance can be disregarded as an effect on the measurements.

Figure 3:
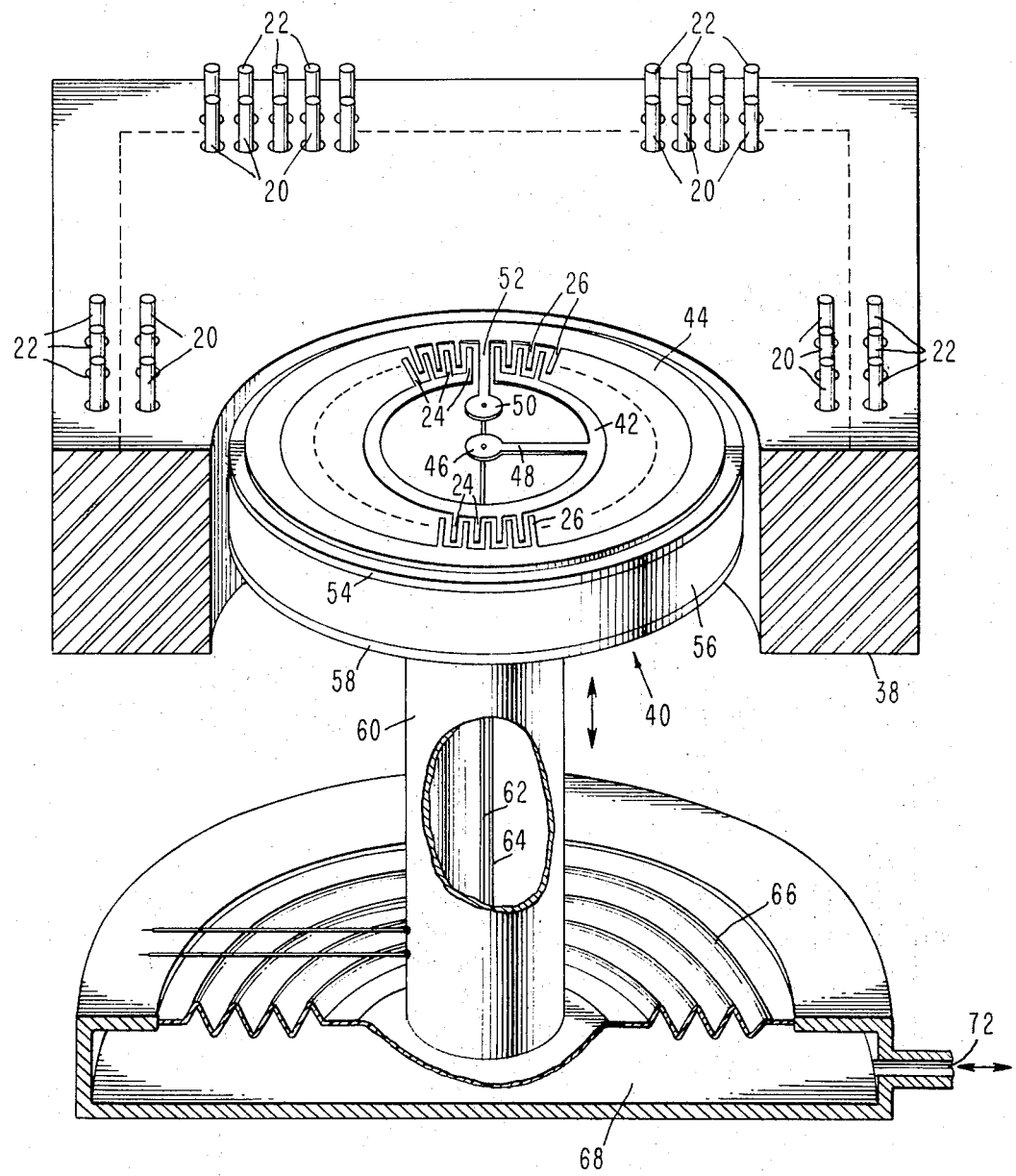
FIG. 3 is one embodiment of the invention for making such electrical connections.

Referring now to FIG. 3, the structure of the probe can be seen. A block 38 of nonconductive material contains a plurality of holes through it. These holes are arranged in two rectangular paths around the periphery of the block and contain bendable fixed position probes 20 and 22 for making contact to the pads 10. These probes extend entirely through the insulated block to some fixed position, not shown, where electrical connections are made to them. As pointed out, when they are pressed against the pattern they bend, making electrical contact to the pads 10.

The block 38 also contains a hole 40 through its center in which the grid probe for making contact with the points 12 is positioned. As can be seen, the fingers 24 and 26 are radial lines with the fingers 24 all connected to an interior circular bus 42 while the fingers 26 are connected to an exterior circular bus 44. The interior circular bus 42 is connected to a tab 46 by printed circuit line 48 while bus 44 is connected to tab 50 by line 52 so that electrical connection can be made to the buses 42 and 44 by connections to the tabs 46 and 50.

The printed circuit just described is mounted on a circular printed circuit board 54 of flexible plastic material such as a polyester film suitable for use in printed circuits. This plastic circuit board, in turn, is mounted on a disc 56 of a polyurethane foam that is attached to a metal base 58 so that the printed circuit board 54, the foam 56 and the metal form a cylinder that moves axially in the hole 40 on a shaft 60. The shaft 60 is hollow and two wires 62 and 64 pass up through the shaft. One wire 62 is electrically connected to point 46 while the other wire 64 is electrically connected to point 50. These wires serve as conduits for making electrical connections to the fingers.

Shaft 60 is mounted on a bellows 66 so that by modifying the pressure within the chamber 68 of the bellows makes the piston and its shaft 60 move axially in the hole 40. In making Kelvin measurements, the probe is lowered on the chip until the fixed point probes 20 and 22 contact the tabs 10. Then air pressure is introduced into the chamber 68 through aperature 72 forcing the conductive lines 24 and 26 on the printed circuit 56 against the points 12. The printed circuit board 54, being a flexible plastic which is mounted on polyurethane foam 56, bends, flexing under the pressure exerted on it, thereby making electrical connections to all the points through the fingers 24 and 26 so that every point 12 in the pattern is contacted by at least one finger 26 and one finger 24 while every tab 10 is contacted by at least one probe 20 and one probe 22.

When contact is made, the test described above can be performed by operating switches 32 and 36 in each of the paths to be checked for continiuty.

Figure 4:
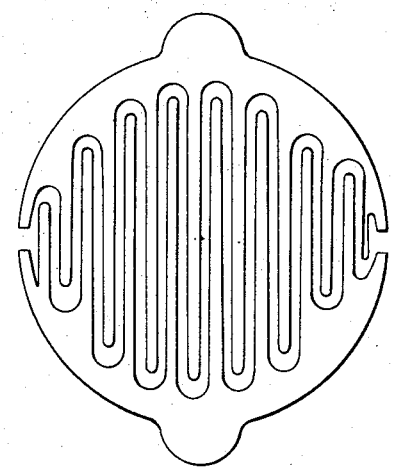
FIG. 4 is an alternative grid to be used with the embodiment of FIG. 3 to make electrical connections.

In the embodiment of FIG. 3, the fingers are shown being arranged radially. This was done because the points 22 with which they have to make contact are arranged in essentially a circular pattern. In some cases though a parallel arrangement of the fingers, such as shown in FIG. 4, may be more suitable.

While the invention has been particularly shown and described with reference to preferred embodiments thereof, it will be understood by those skilled in he art that the above and other changes in form and details may be made therein without departing from the spirit and scope of the invention.

What is claimed is:

1. A probe for making contact to a plurality of points, comprising:
   a first set of conductive lines for making one contact to a point; and
   a second set of conductive lines interlineated between the first series of conductive lines to line centers that are less than one-half the width of the points being contacted whereby each of the points is contacted by at least one line from each of the sets without the necessity of registration between the lines and points.

2. The structure of claim 1 wherein the lines are arranged radially with respect to one another.

3. The structure of claim 1 wherein the lines are arranged parallel to one another.

4. In apparatus for making Kelvin measurements a new probe, comprising:
   a block with a plurality of small peripheral holes and a large central hole;
   a series of fixed position probes each mounted in one of the peripheral holes; and
   a central probe for movement in the central hole on an axis arranged at right angles to the surface of the probe head, said central probe containing a grid of two sets of interlineated conductive lines positioned on centers that are smaller than one-half the width of a number of relatively small points to be contacted by the grid so that the registration is not needed between the lines of the grid and the small central points.

5. The structure of claim 4 wherein the lines are arranged radially with respect to one another.

6. The structure of claim 4 wherein the lines are arranged parallel to one another.

* * * * *